United States Patent
Veitsel et al.

(10) Patent No.: US 10,488,525 B2
(45) Date of Patent: Nov. 26, 2019

(54) METHOD AND SYSTEM FOR DEMODULATING AND TRACKING OF CSK-MODULATED SIGNALS

(71) Applicant: Topcon Positioning Systems, Inc., Livermore, CA (US)

(72) Inventors: Andrey Vladimirovich Veitsel, Moscow (RU); Leonid Victorovich Purto, Moscow (RU); Alexey Stanislavovich Lebedinsky, Moscow (RU); Dmitry Anatolievich Rubtsov, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 235 days.

(21) Appl. No.: 15/549,209

(22) PCT Filed: Nov. 16, 2016

(86) PCT No.: PCT/RU2016/000789
§ 371 (c)(1),
(2) Date: Aug. 7, 2017

(87) PCT Pub. No.: WO2018/093283
PCT Pub. Date: May 24, 2018

(65) Prior Publication Data
US 2018/0239026 A1   Aug. 23, 2018

(51) Int. Cl.
*G01S 19/24* (2010.01)
*G01S 19/27* (2010.01)
*G01S 19/30* (2010.01)

(52) U.S. Cl.
CPC ............ *G01S 19/243* (2013.01); *G01S 19/27* (2013.01); *G01S 19/30* (2013.01)

(58) Field of Classification Search
CPC ........ G01S 19/243; G01S 19/27; G01S 19/30; G01S 19/02
(Continued)

(56) References Cited

U.S. PATENT DOCUMENTS

| 6,493,378 B1 | 12/2002 | Zhodzishsky et al. |
| 9,046,591 B1 | 6/2015 | Yang et al. |
| 2013/0279541 A1* | 10/2013 | Goldberg ............... G01S 19/24 375/142 |

FOREIGN PATENT DOCUMENTS

| RU | 2456630 C1 | 7/2012 |
| WO | 2014/168504 A1 | 10/2014 |

OTHER PUBLICATIONS

Search Report in PCT/RU2016/000789, dated Aug. 17, 2017.
(Continued)

*Primary Examiner* — Bo Fan
(74) *Attorney, Agent, or Firm* — Bardmesser Law Group

(57) ABSTRACT

A method for demodulating and tracking of CSK-modulated signals comprising the steps of receiving a CSK-modulated signal at a plurality of correlators, the CSK-modulated signal including a transmitted symbol; convolving the CSK-modulated signal with a preset reference replica of the CSK-modulated signal for N shifts ($D_1 \ldots D_N$) of a PRN code relative to an internal receiver clock corresponding to N possible code shifts in the transmitted symbol, and M other code shifts ($T_1 \ldots T_M$), where M<N, that satisfies $D_1-\Delta T \leq T_i \leq D_N+\Delta T$ for all $T_i$ from ($T_1 \ldots T_M$); selecting one of the N shifts ($D_{MAX}$) where the convolution is a maximum; adjusting a CSK-signal Delay Locked Loop (DLL) based on a ratio of convolution values for the shifts $D_{MAX}$ and $T_i$ for all $T_i$ for which a modulus $|D_{MAX}-T_i|$ is smaller than a predefined threshold; and determining a value of the transmitted symbol based on $D_{MAX}$.

13 Claims, 5 Drawing Sheets

(58) Field of Classification Search
USPC .................................................. 342/357.66
See application file for complete search history.

(56) References Cited

OTHER PUBLICATIONS

Suzuki Taro et al., Precise point positioning for mobile robots using software GNSS receiver and QZSS LEX signal, 2013 IEEE/RSJ International Conference on Intelligent Robots and Systems (iROS) Nov. 3-7, 2013, Tokyo, Japan.
Pena Axel Javier Garcia et al., Analysis of the use of CSK for future GNSS signals, ION GNSS 20 13, 261h, International Technical Meeting of the Satellite Division of the Institute of Navigation, Sep. 2013, Nashville, United States, ION, pp. 1461-1479 (2013).

\* cited by examiner

METHOD AND SYSTEM FOR DEMODULATING AND TRACKING OF CSK-MODULATED SIGNALS

CROSS REFERENCE TO RELATED APPLICATIONS

This application is a US National Phase of PCT/RU2016/000789 filed on Nov. 16, 2016.

BACKGROUND OF THE INVENTION

Field of the Invention

This invention relates to GNSS navigation receivers, and, more particularly, to GNSS receivers that use complex Code Shift Keying signals.

Description of the Related Art

Global navigation satellite systems (GNSS) signals are often used in many practical applications to precisely determine a position. Progress in the field of satellite navigation requires navigation receivers capable of receiving signals in a ever wider frequency bands, the signals being more complex in processing. Among such complex signals, Code Shift Keying (CSK) should be considered [1]. These signals benefit from better noise-immunity, or from spectral efficiency at the same noise-immunity. This is important for implementation satellite-based augmentation systems (SBAS) for broadcasting a navigation data that supplements data in satellite ephemeris and thus sufficiently improves navigation accuracy. However, CSK demodulation is much more complicated than that of phase-manipulated symbols and in general needs calculation of a full correlation function within the range of all possible PRN-code offsets for each received symbol. The reception of CSK-signals becomes even more complex (and hence, more expensive), if it is accompanied by range tracking (it is also called delay lock loop, or DLL, in the literature), rather than only data demodulation. In this case, a discriminator outputting a range tracking error needs a more detailed correlation function, for example, in increments of half chip, while for a standard demodulator the correlation function with one chip-increments is sufficient.

There is known a device [2] calculating correlation function for receiving CSK-signals using a set of correlators, each of which calculates a convolution of the received signal and reference signal replica (usually a pseudo-random noise code) shifted by a certain value, different for each correlator. A drawback of such a device is the use of many correlators, wherein the reference replica is stored or generated.

In [5], a method and apparatus are disclosed where additional correlators are applied. The correlators are adjusted to an advance code position, i.e., shifted forward (Early correlator), and to a delayed code position, i.e., shifted backward (Late correlator), in a value less than the chip duration. These correlators are employed for tracking code position (the term "code phase" is also used) via a so-called early-late discriminator. Half chip is an optimal shift. Implementation of this method to demodulate and track CSK-signal delay with P bits per symbol requires calculation of $2*2^P+1$ correlation points for each symbol being received. For instance, if there are P=8 bits for each symbol, one needs 513 correlators (256 for data demodulation and 257 for DLL early-late discriminator)—this can exceed the total number of correlators for receiving all other satellite navigation signals.

Another device known as a "sliding" or "parallel" correlator [3] calculates correlation function between the received signal and a reference replica using an array of accumulators updated by the same calculation module. Along with the accumulators, such an apparatus includes memory elements to store the input signal and reference replica. These memory blocks have a lot of outputs equal to a number of simultaneously calculated multiplication and adding operations. A typical configuration for these memory blocks is an implementation in the form of a multi-tapped delay line. The availability of the memory block storing the input signal and computation operation at rates exceeding the chip rate of the input signal allows this device to store only one copy of the replica and employ only one computational module for correlation calculations, thereby making this design cheaper than an equivalent set of separate universal correlators.

A correlator can be a circuit where the correlator's output is calculated as a convolution of a single-bit sample of the input signal and single-bit values of code sequence (replica) (see [4]). The advantage of this correlator's configuration is additional lowering of the cost of the equipment due to using an XOR operation, instead of multi-digit multipliers. Together with the above circuit (see [3]), this construction allows implementing the most efficient method of calculating the correlation function. A main drawback of this is some worsening of noise immunity by 2 dB.

There are known devices for reception of navigation CSK-signals in which correlations of the input signal and replica are calculated by small-digit multipliers (ultimately, single-bit), with memory blocks whose size matches the length of the multipliers' input as well as the number of parallel calculated correlation points. To demodulate and track CSK-signals (specifically to track the unmodulated code phase of the signal), $2*2^P+1=2*N+1$ correlator outputs are calculated in parallel, where N is the range of one CSK symbol data values and P—number of bits per symbol. The doubled number of correlators allows calculation of responses for Early and Late positions. An advantage of such devices is more efficient demodulation and tracking of CSK signals, compared with devices based on universal correlators. A disadvantage is the doubled number of calculators compared to similar devices for demodulating information data only. In addition, there is a 2 dB energy loss if single-digit representation of the input samples in the memory blocks is used. At the same time, single-digit presentation of the input samples is more efficient, since it is implemented on the basis of memory blocks with smallest capacity, which is a further advantage.

In [6], a method and apparatus are disclosed where frequency-phase adjustment of carrier, as well as CSK-signal delay tracking, are implemented by re-calculation of similar tracking parameters of another satellite signal. As such, the satellite signals can be QZSS LEX L6D/L6E CSK-signal and GPS L1 C/A BPSK-signal respectively. This method benefits from demodulation and tracking of CSK-signal with the help of N correlators for the CSK-signal and just one triple correlator for tracking another signal, i.e., N+3 correlators are used instead of 2*N+1 correlators. A drawback of this method is appearance of CSK-signal tracking error due to different conditions of passing CSK-signal and another signal (for example, if the signals are broadcast on different frequencies or from different satellites).

Thus, the known methods for CSK demodulation and code phase tracking with $2^P$ bit-symbol require calculation of the correlation function for $2*2^P+1$ points which causes serious hardware overhead or—in case of more cost-conscious implementations—they cause an energy loss that can be a critical disadvantage for SBAS-enabled devices.

SUMMARY OF THE INVENTION

Accordingly, the present invention is related to a system and method for demodulating and tracking CSK modulated signals that substantially obviates one or more of the disadvantages of the related art.

In one aspect, there is provided a method for demodulating and tracking of CSK-modulated signals comprising the steps of receiving a CSK-modulated signal at a plurality of correlators, the CSK-modulated signal including a transmitted symbol; convolving the CSK-modulated signal with a preset reference replica of the CSK-modulated signal for N shifts ($D_1 \ldots D_N$) of a PRN code relative to an internal receiver clock corresponding to N possible code shifts in the transmitted symbol, and M other code shifts ($T_1 \ldots T_M$), where M<N, that satisfies $D_1 - \Delta T \leq T_i \leq D_N + \Delta T$ for all $T_i$ from ($T_1 \ldots T_M$); selecting one of the N shifts ($D_{MAX}$) where the convolution is a maximum; adjusting a CSK-signal Delay Locked Loop (DLL) based on a ratio of convolution values for the shifts $D_{MAX}$ and $T_i$ for all $T_i$ for which a modulus $|D_{MAX} - T_i|$ is smaller than a predefined threshold; and determining a value of the transmitted symbol based on $D_{MAX}$.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

The objective of the present invention is to provide an efficient and interference-immune method of demodulating CSK signals from a satellite and its further delay (range) tracking. The method is based on the fact that DLL for a GNSS signal at typical navigation conditions has better interference immunity, compared to immunity of demodulation of information bits and to the carrier PLL. This allows the DLL to be adjusted less frequently, and intermediate values for loop adaptation to be calculated at a lower quality. The following important fact should be also noted: a DLL for the CSK-signal in the invention is eventually adjusted according to the error signal being generated directly in the CSK demodulator. The method is as follows:

1) A CSK-modulated signal is fed to the correlators' input.

2) A convolution of the CSK-modulated signal and a predetermined replica is calculated for N replica code offsets ($D_1 \ldots D_N$) relative to the receiver internal time, where the offsets correspond to N possible code shifts in the transmitted symbol, and for M (where M<N) different code shifts ($T_1 \ldots T_M$) where each $T_i$ from ($T_1 \ldots T_M$) satisfies: $D_1 - \Delta T \leq T_i \leq D_N + \Delta T$ 3) One of N offsets ($D_{MAX}$) is further selected such that the convolution at this offset is maximal 4) If there are one or several $T_i$ for which the modulus $|D_{MAX} - T_i|$ is smaller than a threshold, then such $T_i$ are selected and the DLL for the CSK signal is adjusted according to the convolution values for the offsets $D_{MAX}$ and the selected $T_i$ 5) A value of the modulated symbol is determined in accordance with $D_{MAX}$.

Figure 1A:
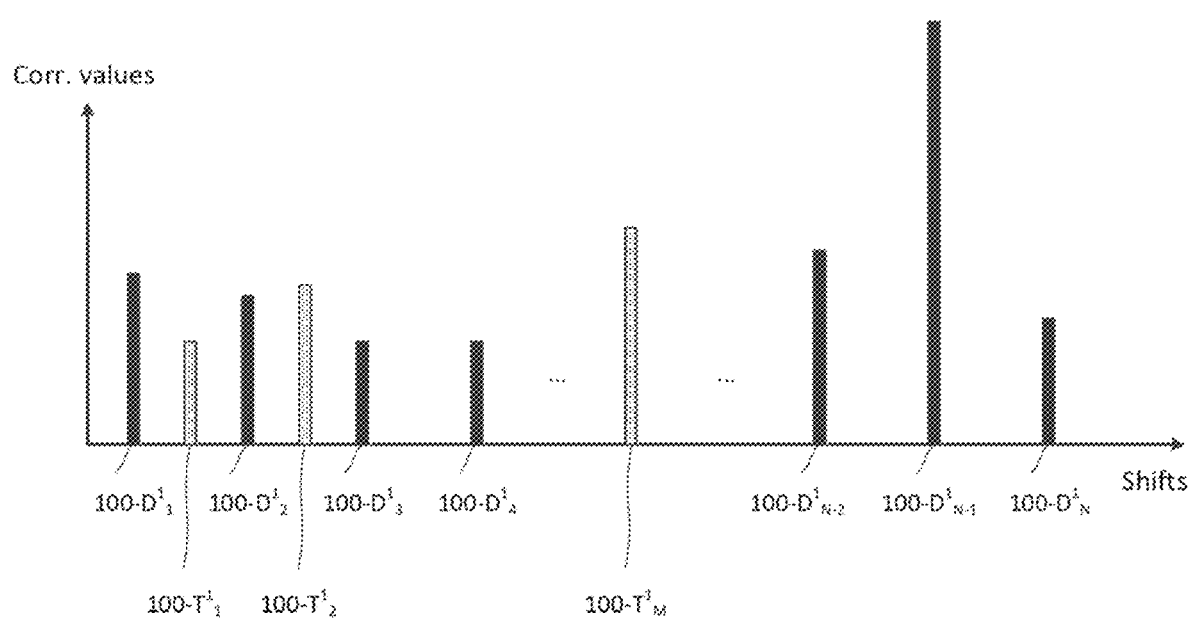
FIG. 1A shows a fragmentary correlation function calculated for one CSK-symbol.
Figure 1B:
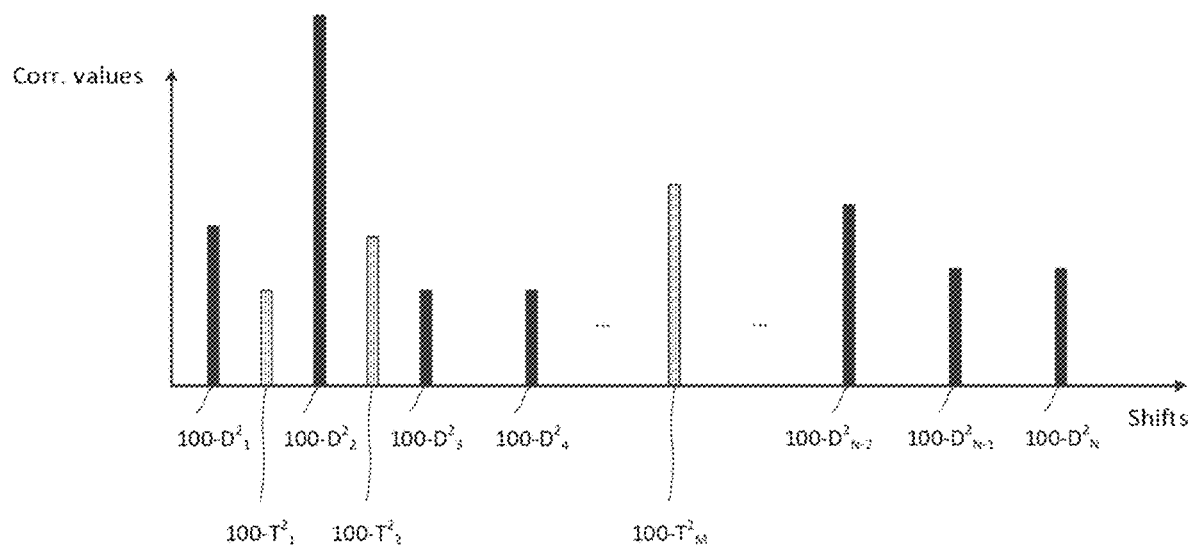
FIG. 1B shows a correlation function calculated for another CSK-symbol.
Figure 2:
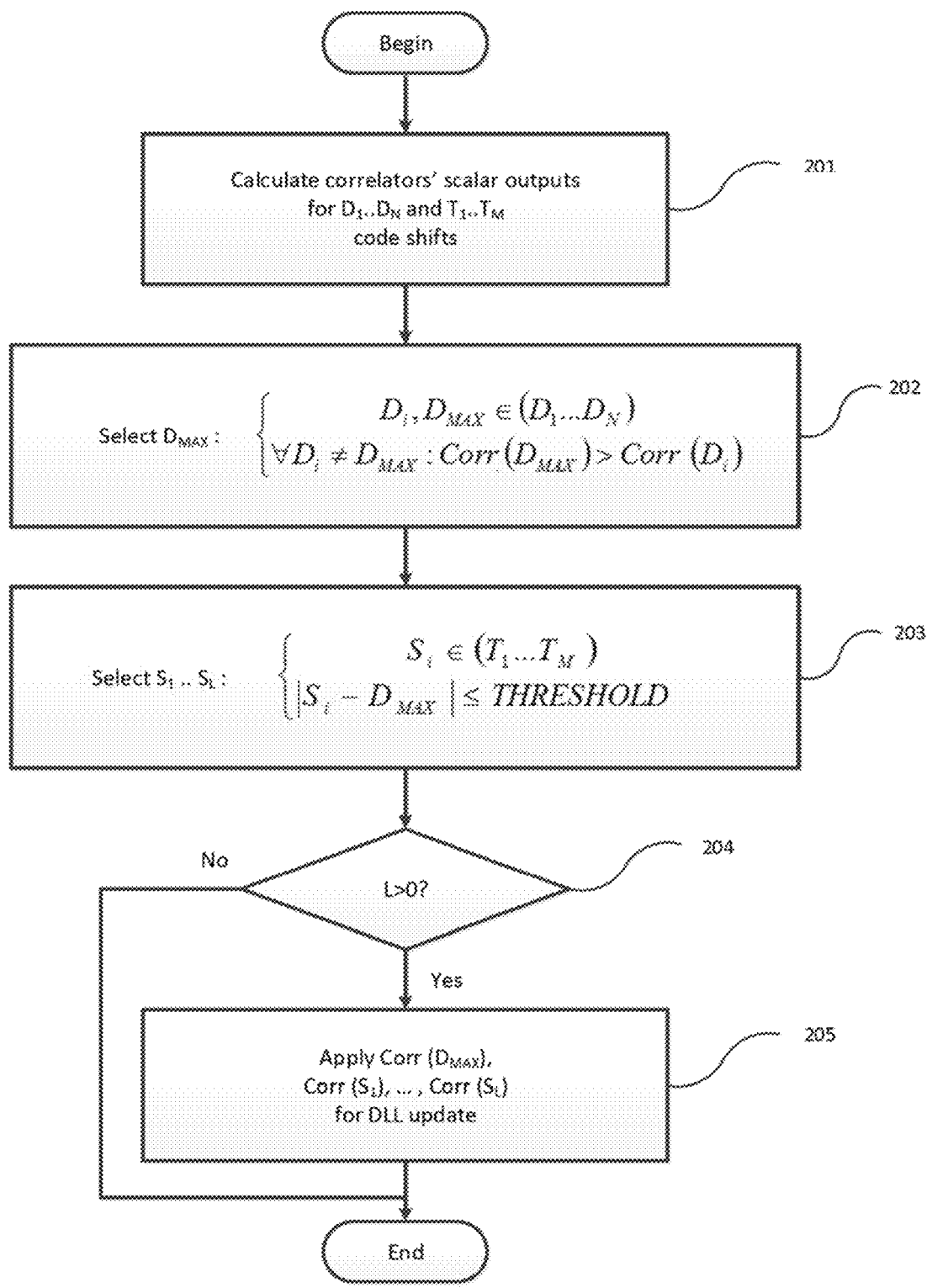
FIG. 2 shows the proposed sequence of steps for demodulation of CSK-symbols.

FIGS. 1A and 1B illustrate the results of step 2. FIG. 2 shows more details for a certain implementation of step 4. FIG. 1A shows a fragmentary correlation function calculated for one CSK-symbol. Scalar correlator outputs 100-$D^1_1$ . . . 100-$D^1_N$ correspond to code shifts ($D_1 \ldots D_N$). To determine the value of the transmitted symbol (steps 3 and 5), a maximum output value is found among these outputs. From the figure one can see that the maximum output is 100-$D^1_{N-1}$. Shift $D_{N-1}$, which codes the bits related to index N-1, corresponds to it. FIG. 1A also shows the outputs of correlators 100-$T^1_1$ . . . 100-$T^1_M$, which correspond to offsets ($T_1 \ldots T_M$). Unlike ($D_1 \ldots D_N$), shifts ($T_1 \ldots T_M$) do not have a regular structure. In the shown implementation, shifts $T_i$ are in the middle of some shifts $D_i$. As value M<N, among shifts ($D_1 \ldots D_N$), there are such shifts $D_i$ which, in the ranges of ($D_{i-1} \ldots D_i$) and ($D_i \ldots D_{i+1}$), are neighboring to the only shift $T_i$ or to none of ($T_1 \ldots T_M$). In particular, there are no additional intermediate shifts from ($T_1 \ldots T_M$) adjacent to the shift $D_{N-1}$. Therefore, the condition checked at step 4 is not met, and adjustment of the DLL is not carried out. The absence of selected $T_i$ that meet the condition 4 corresponds to condition L=0 in FIG. 2.

FIG. 1B shows a correlation function calculated for another CSK-symbol. Its maximum value 100-$D^2_2$ corresponds to shift $D_2$, which confirms that a symbol with index 2 has been received. At the fourth step of the proposed algorithm, the shift $D_2$ is assigned to $D_{MAX}$, the shift $T_1$ is assigned to $S_1$, and the shift $T_2$ is assigned to $S_2$ (see illustration of the algorithm in FIG. 2). Further, the correlator outputs that correspond to $D_{MAX}$ and all selected $T_i$, i.e., to 100-$D^2_2$ ($D_{MAX}$), 100-$T^2_1$ ($S_1$) and 100-$T^2_2$ ($S_2$) are transmitted to the DLL.

The proposed sequence of steps is shown in FIG. 2. Step 2 of the above algorithm corresponds to step 201 in FIG. 2. Step 3 corresponds to step 202, and step 4—to condition 204 and step 205 of this figure respectively. The threshold value THRESHOLD, in some implementations, is taken as half chip duration.

In a typical embodiment of the invention, all the correlators are implemented in digital form so that they perform a convolution of a digitized incoming signal and a digitized replica, and form a digital output. The convolution is performed as a sample-by-sample multiplication of the incoming signal by replica elements with accumulation of the multiplication results. In some embodiments, each multiplication result is additionally multiplied by a complex vector corresponding to current carrier phase. Accumulation of the multiplication results starts and stops in accordance with current correlator configuration. In some embodiments, the duration of convolution of all the employed correlators is identical, whereas the start time of convolution depends on the correlator configuration. A delayed start of the convolution of a fixed replica code with the incoming signal is introduced to apply the required $D_i$ or $T_i$ code shift. In other embodiments, the required code shift is implemented via a convolution of the incoming signal with a shifted code sequence, whereas the convolution start time is fixed. The code sequence in some embodiments is shifted cyclically. In other embodiments, the original code length is truncated so that a wraparound of the code sequence does not occur.

In some embodiments of the invention, intervals between shifts ($T_1 \ldots T_M$) can vary over time. In some other embodiments, correlator outputs for shifts ($T_1 \ldots T_M$) can be calculated less accurate than that of correlator outputs for shifts ($D_1 \ldots D_N$). For example, this can be done by decreasing the size of multiplier inputs and/or outputs used in calculating convolution. Less accurate calculations of correlator outputs for the intermediate (additional) shifts, as well as DLL adjustments not for each CSK-symbol result in worsening DLL interference immunity, but make the apparatus cheaper. If M is much smaller than N, a decrease in DLL interference immunity can be sufficient.

To increase DLL interference immunity, the feedback loop filter in some embodiments is made more narrowband. At the same time, to keep DLL capability in dynamic, some additional information is transmitted for CSK-signal DLL as follows: a receiver receives CSK-signal and another signal with a modulation different from CSK. This signal is generally broadcast on a frequency different from the carrier frequency of the CSK-modulated signal but is synchronized with the CSK-modulated signal. This differently-modulated signal is used to predict changes in pseudoranges to the satellite transmitting CSK-modulated signal, caused by the receiver movement. Then the DLL of the CSK-modulated signals is additionally adjusted according to the prediction. Some embodiments comprise such predictions based on changing delays for the non-CSK-modulated signal. The delays determine changes in pseudoranges to the satellite transmitting this signal. Other embodiments comprise predictions on the basis of receiver's velocity vector calculated by the non-CS K-modulated signal. In a number of embodiments, the predictions for changes in pseudoranges to the satellite transmitting non-CSK-modulated signal are added to the DLL error of CSK-modulated signal.

In the proposed method, a decision scheme of CSK-symbol demodulation is based on the maximum of scalar correlator outputs. In some embodiments scalar correlator outputs are determined as a sum of squares of convolution quadratures. In other embodiments, scalar correlator outputs are a signed value of one of the quadratures. In other embodiments, scalar correlator outputs can be calculated both as a sum of squares of quadratures and as the signed value of one quadrature. In such embodiments, the selection of one or another scalar output, according to which the information encoded in the symbol is defined, is made by estimation of carrier phase error at carrier PLL output. If this averaged PLL error is small enough (smaller than a threshold), the decision scheme works using maximum value of one of signed correlator quadratures. Otherwise, the decision scheme is switched to the mode based on the sum of quadrature squares. This principle is illustrated in FIG. 3.

Figure 3:
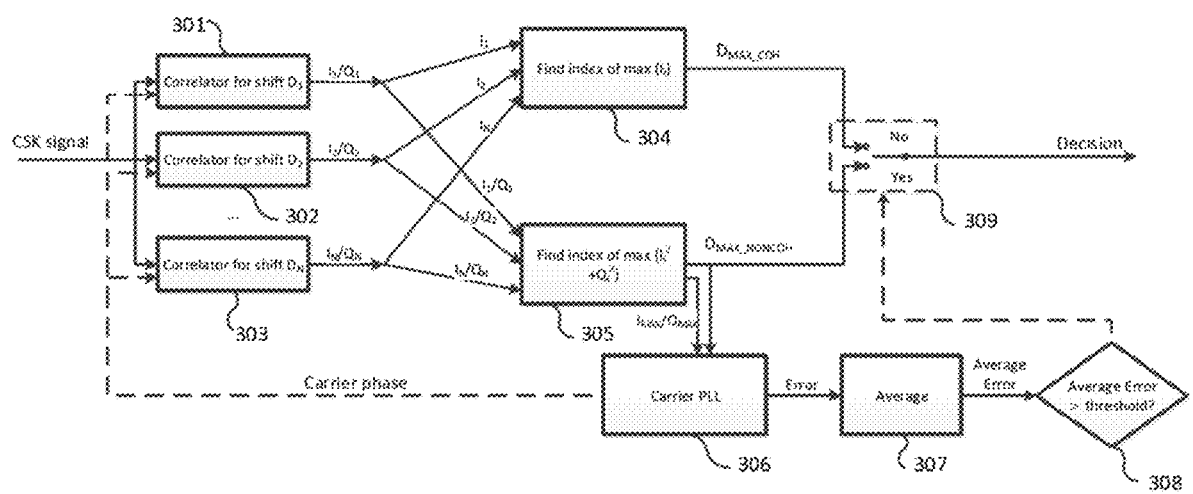
FIG. 3 shows a functional schematic of a device implementing CSK demodulation in two modes: a mode of selecting power maximum (incoherent demodulation) and a mode of selecting quadrature-only maximum (coherent demodulation).

It should be noted that a block scheme of a CSK-symbol demodulator of FIG. 3 is one of possible embodiments. According to this variant, the decision scheme demodulates a symbol considering both types of correlator outputs: maximum correlator output power (maximum of a sum of quadratures) and a maximum of one of signed correlator quadratures (in this case, the I quadrature).

From FIG. 3, carrier PLL (block 306) is always adjusted according to the decision scheme operating on maximum power (output of block 305). In some embodiments, where scalar correlator outputs are determined only as a signed value of one quadrature, switch 309 is always in position No, and there are no blocks 307 and 308. In some embodiments, some of the correlators are calculated only on the I quadrature, other correlators calculate both quadratures. The correlators calculating both quadratures are reconfigurable to different shifts $D_i$ or $T_i$ during receiver operation. In some embodiments, shift $D_i$ corresponding to the known data being received by the receiver is duplicated in correlators of both types: in one single-quadrature correlator and in one correlator with two-quadrature outputs. In some embodiments, carrier PLL is turned off at the moment of receiving unknown data, and it is turned on again when the known data is received. Calculation of only the I quadrature by a subset of the receiver correlators additionally makes this embodiment cheaper.

An example of embodiment of the invention can be considered for reception QZSS LEX L6D/L6E CSK-signal. Since the L6D signal is multiplexed with the L6E signal, to demodulate two multiplexed 8-bit CSK symbols in parallel as many as 512 correlators configured to ($D'_1 \ldots D'_{512}$) code shifts should be employed. The difference between adjacent $D'_i$ and $D'_{i+1}$ should be equal to a time interval between adjacent chips in the multiplexed signal. The correlators perform convolution that forms a single quadrature output, which is sufficient if the whole signal energy is concentrated in one quadrature. Additionally, a small number of correlators with two-quadrature outputs are to be implemented. Demodulation of the L6D and L6E signals are two independent processes. Therefore, they can be considered separately. Demodulation of, for example, the L6D signal, requires 256 single quadrature correlators configured to ($D_1 \ldots D_{256}$) code shifts with a shift increment equal to a time interval between consecutive L6D chips. The number of additional correlators with two-quadrature output can be for instance equal to 16. This value can be increased or decreased with no significant effect. Code shifts ($T_1 \ldots T_{16}$) of two-quadrature correlators can vary relative to each other, which is used to effectively utilize them during known data reception. Let $\Delta T$ be half length of L6D chip. Then, $D_{i+1}-D_i=\Delta T*4$ due to multiplexing with L6E chips. For the additional two-quadrature correlators the following two conditions need to be met:

1) min ($|T_i-D_j|$) should always be equal to $\Delta T$ if $T_i$ belongs to ($T_1 \ldots T_8$) for example, and 2) min ($|T_i-D_j|$) should always be zero for $T_i$ belonging to ($T_9 \ldots T_{16}$).

For time intervals, when known data is broadcast, one of the code shifts $T_i$ in conditions above is set in accordance with known data value. Otherwise, the shifts $T_i$ from above conditions could be arbitrary.

For time intervals, when the first condition above is met for code shift $D_{MAX}$, which corresponds to the max signed output of 256 single-quadrature correlators, the output value for code shift $D_{MAX}$ and one or two values of correlator outputs with neighboring $T_i$ are fed to early-late DLL discriminator. The early-late discriminator in this particular example is implemented as $$\frac{\text{Early} - \text{Late}}{\text{Prompt}},$$

where Early value is signed output of correlator with code shift $T_i = D_{MAX} - \Delta T$, Late value is signed output of correlator with code shift $T_i = D_{MAX} + \Delta T$, Prompt is signed output of correlator with code shift $D_{MAX}$. The limited number of implemented shifts $T_i$ leads to possible absence of Early or Late value or both. The absent values are substituted by zero. The discriminator output after averaging is fed back to all the correlators and tune ($D_1 \ldots D_{256}$) and ($T_1 \ldots T_{16}$) code shifts.

For time intervals, when the second condition above is met for code shift $D_{MAX}$, the two-quadrature output for code shift $D_{MAX}$ is fed to the carrier PLL. Information from the carrier PLL is converted to the single-quadrature correlators' settings, so that correlators with code shift corresponding to the received CSK-symbol accumulate output with no energy loss of the CSK signal in the single quadrature, and the value of the quadrature is positive.

Both the DLL and carrier PLL in the above example are also assisted by code and carrier phase forecast obtained from velocity vector calculated by the navigation receiver. The assisted information allows to robustly track carrier and code phases of the CSK signal even at high dynamic movements of the receiver. The residual error is insensitive to high dynamic movements and can be eliminated slowly with help of the CSK-based DLL and PLL. In its turn, slow adaptation of the tracking loops allows to filter out adaptation noise caused by punctured (zeroed from time to time) DLL and PLL inputs. Thus, high quality demodulation and tracking of CSK signal is achieved with reduced hardware resources: with N=256 single quadrature correlators and M=16 two-quadrature correlators.

In another embodiment of the invention, a multiplexed signal such as QZSS LEX L6D/L6E can be demodulated without separation of L6D and L6E components. In such an implementation the single-quadrature correlators with said ($D'_1 \ldots D'_{512}$) code shifts and additional two-quadrature correlators with code shifts ($T'_1 \ldots T'_{32}$) with a total number of 32 (for example) are connected to a common carrier PLL and a common DLL, same as described in the previous example. Two conditions from the previous example for code shifts $T_i$ need to be met as well. The difference is that two correlators with maximum signed quadrature output are searched. Let $D^D_{MAX}$ and $D^E_{MAX}$ be the code shifts of the selected correlators. The code shift $D^D_{MAX}$ is selected between shifts with odd indices: ($D'_1, D'_3, D'_5 \ldots D'_{511}$), the code shift $D^E_{MAX}$ is selected between shifts with even indices: ($D'_2, D'_4, D'_6 \ldots D'_{512}$). Index of the $D^D_{MAX}$ code shift is used to determine data value modulated in the L6D signal. Index of the $D^E_{MAX}$ code shift is used to determine the data value modulated in the L6E signal.

For time intervals, when the first condition above is met for code shift $D^D_{MAX}$ or $D^E_{MAX}$ or both, the selected correlator outputs, and outputs from two-quadrature correlators with neighboring $T'_i$, are fed to the early-late DLL discriminator as described in previous example. Similarly, for time intervals, when the second condition above is met for code shift $D^D_{MAX}$ or $D^E_{MAX}$ or both, the two-quadrature outputs for the code shifts are fed to the carrier PLL. For time intervals, when none of the above conditions is met for $D^D_{MAX}$ or $D^E_{MAX}$, the DLL and the carrier PLL are not updated.

In some embodiments, a multiplexed CSK signal, such as considered above, is demodulated in non-coherent mode, i.e., scalar correlator outputs among which the maximum value is selected are calculated as a power of two quadratures. In other embodiments, both coherent and non-coherent demodulation is supported. To implement decision schemes for coherent and non-coherent demodulation, the $D^D_{MAX}$ and $D^E_{MAX}$ are calculated either according to maximum of one signed quadrature or according to power of two quadrature's correspondingly.

A navigation receiver includes an ADC, a computation device, an array of first type correlators and an array of second type correlators. In the array of correlators of the first type code delay, carrier phase and carrier frequency are simultaneously controlled via a common controlling input. In the array of correlators of the second type, code delay is individually controlled for each correlator or for each sub-group of correlators, whereas carrier phase and carrier frequency of the correlators are controlled via a common controlling input affecting all the correlators at once (similar to the array of first type correlators). The array of first type correlators also includes at least one unit to select a maximum. An ADC output is connected to a signal input of the arrays of first and second type correlators. Correlator outputs in the array of first type correlators are connected to the input of the max selection unit. The output of the max selection unit is connected to the first input of the computation unit. Correlator outputs in the array of second type correlators are connected to the array of second inputs of the computation unit. The first output of the computation unit is connected to the common input controlling code delay, carrier phase and frequency for the array of first type correlators, the array of third outputs of the computation unit is connected to the inputs controlling code delays of correlators in the array of second type correlators. The second output of the computation unit is connected to the common input controlling carrier frequency and phase of the array of second type correlators.

Figure 4:
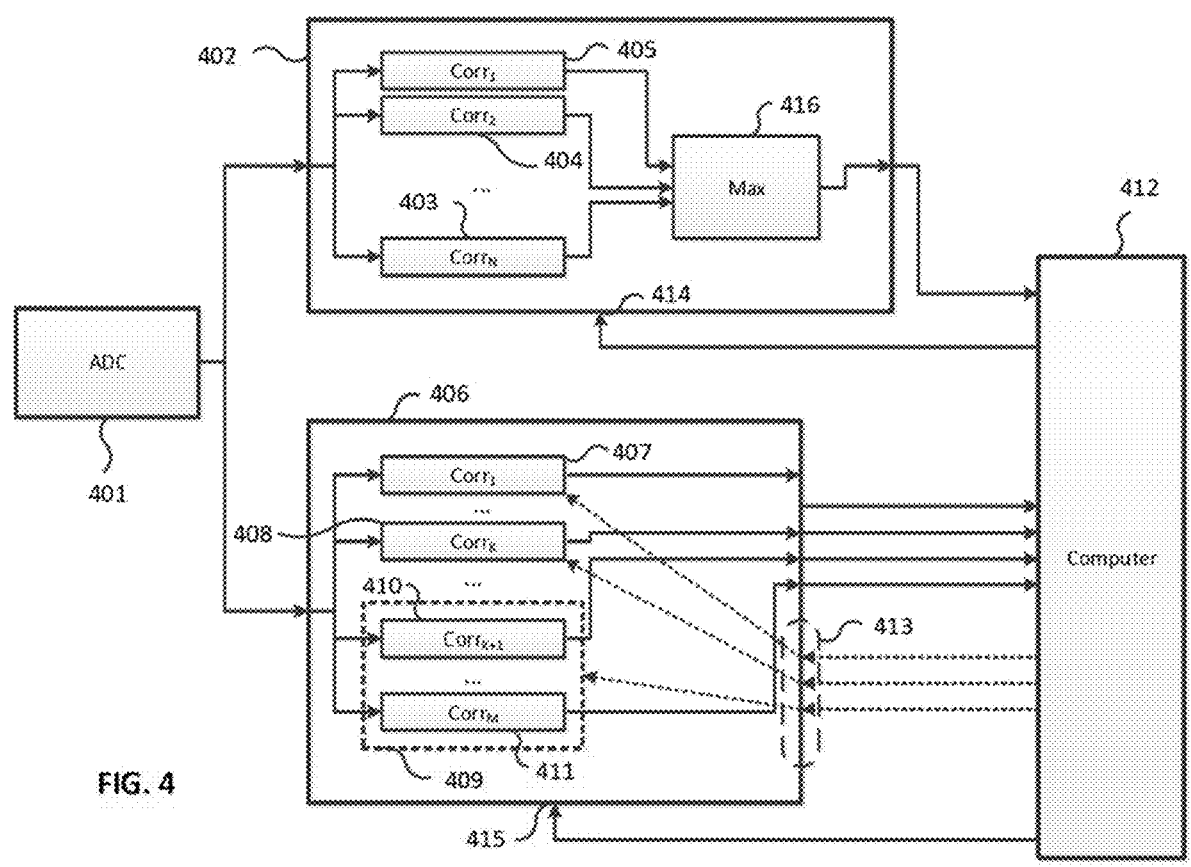
FIG. 4 shows one of the embodiments for a navigation receiver based on the proposed method.

FIG. 4 presents an embodiment of such a device. It is important that the number of correlators in the array of first type correlators (402) designated by N in this figure, is greater than the number of correlators in the array of second type correlators (406), designated by M. The correlators in the array of first type correlators are adjusted to the entire possible set of code shifts in the received symbol. The correlators in the array of second type correlators are adjusted to some intermediate code shifts, as well as (for some embodiments) to some possible code shifts identical to code shifts in the array of first type correlators. In operation, code shifts in the array of second type correlators can change relative to code shifts in the array of first type correlators. The max selection unit determines a value of the received information symbol. The correlators in the array of second type correlators output some information for DLL.

In a number of embodiments the module of second type correlators includes only code delay individually-adjusted correlators. In other embodiments, the array of second type correlators consists of correlator sub-groups, each of which is individually adjusted so that code delays of all correlators in the sub-groups are reconfigured in a group way. In some other embodiments, in the array of second type correlators there are both individually-adjusted correlators, and individually-adjusted sub-groups of correlators. In this embodiments the whole sub-group is simultaneously controlled in code delay, each correlator in the sub-group being adjusted to its own code delay, which is different from other correlators in the sub-group, according to a law. In some embodiments, code shift separation in one chip is applied, so that the rule of configuring correlators in the sub-group could be as follows. The first correlator in the sub-group is configured to work with a code shift given in a configuration command, the second correlator is configured to work with given code shift increased by one chip, the third correlator is to work with given code shift increased by two chips, and so on. Similarly, each correlator in array of first type correlators is adjusted in group way, according to a law when new information about code delay is fed to the common control input. The law of configuring correlators in the array of first type distributes code shifts so that they correspond to all possible code shifts in the received symbol.

In some embodiments, correlators in the array of first type correlators calculate only one quadrature component. This is enough to demodulate the CSK-symbol when carrier PLL is converged. At the same time, the correlators in the array of second type correlators calculate both quadrature components, enabling carrier PLL to be adapted to the time instants when code shift in the received symbol corresponds to the code shift in one of the correlators of the array of second type correlators.

In embodiments, designated to receive multiplexed signals such as QZSS LEX L6D/L6E, a second unit to select maximum is included in the array of correlators of the first type. In the embodiments one part of correlators in the array of first type correlators is connected by their outputs to the first maximum selection unit, the rest part of correlators is connected to the second maximum selection unit. Outputs of the maximum selection units are connected to the first input of the computation unit.

In some embodiments the correlators are implemented in form of an integrated circuit. In such embodiments correlators in array of first type and in array of second type can be implemented differently. The correlators in the array of first type correlators calculate only one quadrature, whereas other correlators calculate two quadratures. In addition, the correlators from the array of second type correlators in some embodiments contain accumulators with reduced size as well as multipliers and sine/cosine tables with fewer number of digits and table entries. Difference in code phase control in the correlators from array of the first type and array of the second type correlators along with other differences in some embodiments lead to completely different implementations of the correlator arrays. The correlators in array of the first type correlators are implemented as one unit that contains the only module to convolute incoming signal and replica. At the same time the unit contains an array of accumulators to store accumulation results for different code shifts. The unit also contains one or several maximum selection module. All these parts have access to the array of accumulators and are controlled via common interface and internal logic.

In some embodiments the sub-groups of correlators in array of second type correlators are implemented in similar way as array of first type correlators. But unlike the array of first type correlators the unit implementing a sub-group of correlators does not contain maximum selection unit. All correlator outputs in the sub-group are connected to the computation unit.

The computation unit in typical embodiments is a processor, which may be implemented as a standalone processor, a PLD or an ASIC.

In some embodiments the navigation receiver contains correlators capable to process a signal with modulation different from CSK. Inputs of these correlators are connected to the ADC, and the outputs are connected to the computation unit.

FIGS. 1A and 1B show fragments of correlation functions for two CS K-symbols calculated in accordance with the proposed method. FIG. 1A shows the following scalar outputs of correlators during reception of the first symbol: $100\text{-}D^1_1$ is the scalar correlator output for shift $D_1$, $100\text{-}D^1_2$ is the scalar correlator output for shift $D_2$, $100\text{-}D^1_3$ is the scalar correlator output for shift $D_3$, $100\text{-}D^1_4$ is the scalar correlator output for shift $D_4$, $100\text{-}D^1_{N-2}$ is the scalar correlator output for shift $D_{N-2}$, $100\text{-}D^1_{N-1}$ is the scalar correlator output for shift $D_{N-1}$, $100\text{-}D^1_N$ is the scalar correlator output for shift $D_N$, $100\text{-}T^1_1$ is the scalar correlator output for shift $T_1$, $100\text{-}T^1_2$ is the scalar correlator output for shift $T_2$, $100\text{-}T^1_M$ is the scalar correlator output for shift $T_M$. Scalar correlator outputs for shifts ($D_5 \ldots D_{N-3}$) and ($T_3 \ldots T_{M-1}$) are not shown. Scalar outputs $100\text{-}D^1_1 \ldots 100\text{-}D^1_N$ correspond to all possible replica shifts in the received symbol considering those not shown, scalar outputs $100\text{-}T^1_1 \ldots 100\text{-}T^1_M$ correspond to the intermediate replica shifts including not shown shifts. Similarly, FIG. 1B shows scalar correlator outputs during reception of the second symbol: scalar outputs $100\text{-}D^2_1 \ldots 00\text{-}D^2_N$ correspond to all possible replica shifts in the received symbol, scalar outputs $100\text{-}T^2_1 \ldots 100\text{-}T^2_M$ correspond to intermediate replica shifts.

From FIG. 1A it is seen that the correlation maximum during receiving the first symbol matches shift $D_{N-1}$. Similarly, from FIG. 1B in receiving the second symbol the correlation maximum corresponds to shift $D_2$. Position $D_2$ is neighboring to positions $T_1$ and $T_2$, correlator outputs for which are also calculated. At the same time shift $D_{N-1}$ is neighboring to none $T_i$.

FIG. 2 presents a block-scheme of the main algorithm part operating with correlators. Correlator outputs for shifts $D_1 \ldots D_N$ and $T_1 \ldots T_M$ corresponding to N possible code shifts in the received symbol and M intermediate shifts are calculated at step 201. At step 202, shift $D_{MAX}$ is found among $D_1 \ldots D_N$ at which scalar correlator output is maximal. At step 203, shifts $S_1 \ldots S_L$ distant from $D_{MAX}$ by a value smaller than a threshold are searched among $T_1 \ldots T_M$. At step 204, it is checked if such shifts exist. If yes (if L>0), step 205 is performed: correlator outputs for shift $D_{MAX}$, and for shifts $S_1 \ldots S_L$ are sent to DLL discriminator.

FIG. 3 presents a structural scheme of an abstract device implementing CSK demodulation in two modes: a mode of selecting power maximum (incoherent demodulation) and a mode of selecting quadrature-only maximum (coherent demodulation). The following operations are made in the device: a convolution for code shift $D_1$ is calculated in correlator 301, a convolution for code shift $D_2$ is calculated in correlator 302, and a convolution for code shift $D_N$ is calculated in correlator 303. These shifts correspond to some of expected possible shifts for one CSK-symbol. Quadrature outputs of correlators 301, 302, 303, as well as similar correlators for shifts ($D_3 \ldots D_{N-1}$) which are not shown in the figure are sent to block 305 determining the correlator output with maximal power (index MAX_NONCOH). In-phase quadrature I from outputs of correlators 301, 302, 303, as well as from similar correlators for shifts ($D_3 \ldots D_{N-1}$) are transmitted to block 304, determining a correlator output with maximal signed quadrature I (index MAX_COH). The output of block 304 is shift $D_{MAX\_COH}$ and index MAX_COH related to it. The output of block 305 are shift $D_{MAX\_NONCOH}$ and index MAX_NONCOH relevant to it, as well as quadratures from the selected correlator. The outputs of block 305 are sent to block 306, which implements carrier PLL. In block 306 carrier phase is adjusted, such that quadrature I in complex vector $\{I_{MAX}, Q_{MAX}\}$ was max positive. The output of block 306 is phase error averaged over some time interval in block 307. The averaged error is analyzed for exceeding the threshold (comparator 308). If the threshold is exceeded, a switch 309 is moved to position Yes, otherwise, in position No. If the switch 309 is in position Yes, the output of the demodulator is the output of block 305, otherwise—the output of block 304.

FIG. 4 shows one of the embodiments for a navigation receiver based on the proposed method. The device includes an array of first type correlators 402, an array of second type correlators 406, an ADC 401, and a computation unit 412 (which may be a microprocessor, an ASIC, a PLD or a stand-alone computer). The array of first type correlators includes correlators 403, 404, 405, and a unit selecting maximum 416. A common controlling input 414 controls correlators in the array of first type correlators. Some information fed to this input simultaneously affects all the correlators. The array of second type correlators comprises correlators 407, 408 individually-adjusted by code delay, a sub-group of correlators 409 with correlators 410, 411. Code delay of the sub-group is adjusted individually. The control of code delay in the correlators within the array of second type correlators is implemented by an array of controlling inputs 413. Carrier phase and frequency is controlled via common controlling input 415.

The components and blocks shown in FIGS. 3 and 4 may be implemented as discrete components, as ASIC(s) or PLD(s), or as software executing on a processor.

Having thus described a preferred embodiment, it should be apparent to those skilled in the art that certain advantages of the described method and system have been achieved.

It should also be appreciated that various modifications, adaptations, and alternative embodiments thereof may be made within the scope and spirit of the present invention. The invention is further defined by the following claims.

REFERENCES

[1] Axel Javier Garcia Peña, Daniel Salós, Olivier Julien, Lionel Ries, Thomas Grelier. Analysis of the use of CSK for Future GNSS Signals. ION GNSS 2013, 26th International Technical Meeting of the Satellite Division of the Institute of Navigation, September 2013, Nashville, United States. ION, pp 1461-1479, 2013. HAL Id: hal-00936952, version 1, https:**hal.enac.archives-ouvertes.fr/hal-00936952
[2] U.S. Pat. No. 4,707,839 A (Spread spectrum correlator for recovering CCSK data from a PN spread MSK waveform)
[3] EP 0668663 A1 (Sliding correlation detector)
[4] U.S. Pat. No. 5,146,471 A (Correlator for spread spectrum communications systems)
[5] "Decision-Directed Coherent Delay-Lock Tracking Loop for DS-Spread-Spectrum Signals", *IEEE Trans. on Communications*, vol. 39, No. 5, May 1991, pp. 758-765, https:**pdfs.semanticscholar.org/4152/56d775103c01a12d613c0c1866ac9eb2ccce.pdf
[6] WO 2014017338 A1 (Satellite positioning signal receiving method and device), PCT/JP2013/069305

What is claimed is:

1. A method for demodulating and tracking of CSK-modulated signals comprising the steps of:
    receiving a CSK-modulated signal at a plurality of correlators, the CSK-modulated signal including multi-bit transmitted symbols;
    for each symbol, convolving the CSK-modulated signal with a preset reference replica of the CSK-modulated signal for N shifts ($D_1 \ldots D_N$) of a PRN code relative to an internal receiver clock corresponding to N possible code shifts in the transmitted symbol, and M other code shifts ($T_1 \ldots T_M$), so that combined N and M shifts are irregularly spaced, where M<N, that satisfies $D_1-\Delta T \leq T_i \leq D_N+\Delta T$ for all $T_i$ from ($T_1 \ldots T_M$);
    for each symbol, selecting one of the N shifts ($D_{MAX}$) where the convolution is a maximum;
    adjusting a CSK-signal Delay Locked Loop (DLL) based on a ratio of convolution values for the shifts $D_{MAX}$ and $T_i$ for all $T_i$ for which a modulus $|D_{MAX}-T_i|$ is smaller than a predefined threshold; and
    determining a value of the transmitted symbol based on $D_{MAX}$.
2. The method of claim 1, wherein the adjusting of the DLL includes changes of ($D_1 \ldots D_N$) and ($T_1 \ldots T_M$).
3. The method of claim 2, wherein the calculated convolutions for code shifts ($T_1 \ldots T_M$), intermediate multiplication results of samples and codes are rounded down to values less than multiplication results of samples and codes obtained in calculation convolutions for shifts ($D_1 \ldots D_N$).
4. The method of claim 3, wherein a radio navigation signal different from the CSK-modulated signal but synchronized with the CSK-modulated signal is received by at least one additional correlator using the internal receiver clock,
    calculating a change in pseudorange to a satellite broadcasting the signal different from the CSK-modulated signal,
    calculating a receiver velocity vector, and
    making a prediction of a change in pseudoranges to the satellite broadcasting the CSK-modulated signal based on change in pseudorange of the non-CSK signal, and
    transmitting the prediction as an additional control action to the CSK-signal DLL, where the transmitted change is added to the shifts ($D_1 \ldots D_N$) and ($T_1 \ldots T_M$).
5. The method of claim 4, wherein two maximums are determined among the convolution for the code shifts ($D_1 \ldots D_N$): a shift $D_{MAX\_NONCOH}$ corresponding to a maximum power of the convolution, and a shift $D_{MAX\_COH}$, corresponding to a maximum of one signed quadrature of the convolutions.
6. The method of claim 5, further comprising transmitting a correlator output at shift $D_{MAX\_NONCOH}$ to a carrier PLL in order to estimate a carrier phase of the CSK-modulated signal.
7. The method of claim 6, further comprising averaging and comparing an error of the carrier PLL with a threshold, and if an error of the phase exceeds the threshold, the shift $D_{MAX}$ is determined as $D_{MAX\_NONCOH}$, otherwise as $D_{MAX\_COH}$.
8. The method of claim 6, wherein only one quadrature of the correlator output is calculated for some shifts from ($D_1 \ldots D_N$).
9. The method of claim 8, wherein the shift $D_{MAX}$ is determined as $D_{MAX\_COH}$.

10. The method of claim 2, wherein the threshold and $\Delta T$ are about a half of chip.

11. The method of claim 2, wherein N shifts ($D_1 \ldots D_N$) of a PRN code correspond to possible code shifts in two multiplexed transmitted CSK-symbols as follows: one part of N shifts corresponds to the first multiplexed symbol, and remaining shifts correspond to the second symbol.

12. The method of claim 11, further comprising selecting one additional shift ($D'_{MAX}$) of the N shifts where the convolution is a maximum for the second symbol, whereas $D_{MAX}$ is the shift where the convolution is a maximum for the first symbol.

13. The method of claim 12, further comprising adjusting DLL and determining values of the transmitted multiplexed symbols based on $D_{MAX}$ and $D'_{MAX}$.

* * * * *